(No Model.)
J. B. JOHNSON.
DEVICE FOR ASSORTING BERRIES, &c.
No. 329,565. Patented Nov. 3, 1885.
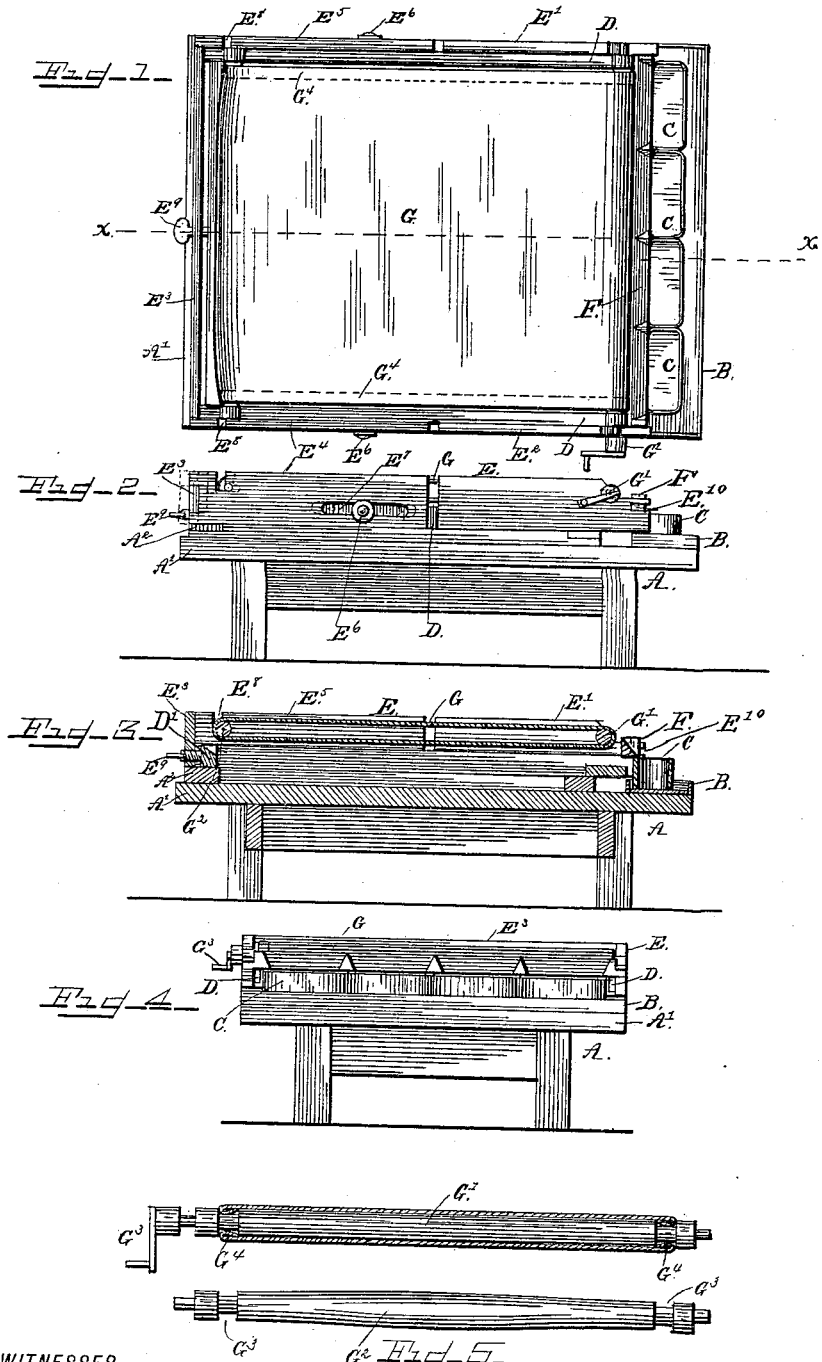
WITNESSES
R. W. Bishop.
G. P. Kramer.
INVENTOR
John B. Johnson
By R. S. & A. Lacey Attorneys.

UNITED STATES PATENT OFFICE.

JOHN B. JOHNSON, OF JUDSONIA, ARKANSAS.

DEVICE FOR ASSORTING BERRIES, &c.

SPECIFICATION forming part of Letters Patent No. 329,565, dated November 3, 1885.

Application filed August 1, 1885. Serial No. 173,303. (No model.)

*To all whom it may concern:*

Be it known that I, JOHN B. JOHNSON, a citizen of the United States, residing at Judsonia, in the county of White and State of Arkansas, have invented certain new and useful Improvements in Devices for Assorting Berries, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is intended to supply a device by which gardeners, farmers, and other persons engaged in the cultivation and sale of berries and similar fruit can quickly and easily assort the same and remove such as is unsalable therefrom, also leaves and other foreign matter.

To this end it consists in certain novel features, all of which will be hereinafter fully described, and specifically pointed out in the claim.

In the drawings, Figure 1 is a plan view, and Fig. 2 a side elevation, of my device. Fig. 3 is a longitudinal section on the line X X, Fig. 1. Fig. 4 is a rear elevation, and Fig. 5 is a detail view of the rollers, the apron being shown on one of them in section.

Referring to the drawings, A designates a table of ordinary construction. Upon the top A' of this table I rigidly secure a rectangular framing, $A^2$, upon which the apron-supporting framing is placed. The rectangular apron-supporting frame $A^2$ is made of a less length than the top A' of the table, and is placed very near one end thereof. Upon the other end of the table I place a tray, B, which holds the fruit-boxes C. Upon the frame $A^2$, I secure a rectangular frame, D, which is made slightly narrower and somewhat longer than the frame $A^2$. I make the frame D of the stated size relative to the frame $A^2$, in order that the sides of the frame E, which support the endless apron, may rest on the frame $A^2$ and be supported thereby. The front cross-bar, D', of the frame D is beveled along its upper inner edge, so as to permit the free passage of the endless apron. The frame E is composed of three sections, E' $E^2$ $E^3$. The sections E' $E^2$ are the same in construction, and are composed each of a single piece rigidly secured to the frames D and $A^2$. The section $E^3$ is composed of two side arms, $E^4$ $E^5$, connected at their rear ends by a cross-bar, as shown. The side arms, $E^4$ $E^5$, are held in position by set-screws $E^6$, working through slots $E^7$ against the side bars of the frame D. They are provided near their front ends in their upper edges with L-shaped notches or slots $E^8$, within which the front apron-carrying roller is journaled. Through the cross-bar of the section $E^3$, I insert a thumb-screw, $E^9$, which bears against the cross-bar D' of the frame D. The rear edges of the sections E' $E^2$ are slotted, as shown at $E^{10}$, and within these slots I secure the ends of the guide-bar F, which extends across the front of the device. Above the slots $E^{10}$ the front edges of the sections E' $E^2$ are cut away and notched to provide bearings for the journals of the rear apron-carrying roller.

The guide-bar F, above referred to, is provided with the beveled portions or chutes F', of equal length and of any desired number, the purposes of which will be hereinafter more fully set forth.

G is the endless apron, which is carried and operated by the rollers G' $G^2$, as shown. These rollers are provided with annular grooves $G^3$, into which the hems $G^4$ of the endless apron fit. The hems are made by turning the edges of the apron under and around cords or tapes and then stitching, as shown. The rear roller, G', is extended past one side of the framing, and provided with a crank, $G^3$. The roller G' is of the same diameter throughout its length; but the roller $G^2$ is of a greater diameter in the center than at its ends, so as to prevent the apron sagging in the middle by the weight of the fruit in the operation of the device. The apron is kept in position on the rollers by fitting the hems of the apron into grooves in the rollers, as before described.

In use the fruit is placed on the apron G, somewhat evenly distributed thereon, and assorted. Then by turning the crank $G^3$ the fruit is carried forward by the apron, and will pass over the guide-bar into the fruit-boxes without striking against their sharp edges. A narrow space is left between the rear of the apron and the guide-bar, so that no dirt, &c., will pass over into the fruit-boxes. The apron is tightened and slackened by turning the thumb-screw $E^2$, which, bearing against the bar $D'$, will cause the section $E^3$ to move forward or backward, as may be desired. This will be readily understood on reference to the dotted lines in Fig. 2. When the boxes have been filled, they can be removed and replaced by empty ones, as will be understood.

Having thus described my invention, what I claim, and desire to secure by Letters Patent, is—

The herein-described device, comprising the table A, rectangular frame $A^2$, of less length than the top of the table A and placed thereon near one end, rectangular frame D, narrower and longer than the frame $A^2$, the sectional frame E, united at one end by the cross-bar $E^3$, and at its other end by a cross-bar, F, having beveled portions to form chutes, the section united by the bar F being stationarily mounted on the frame $A^2$, the other section being loosely mounted thereon, and having its sides slotted and held to the frame D by set-screws, and adjusted by a thumb-screw bearing against the end of the frame D, rollers mounted in slots near each end of the sections, a carrier-belt supported by the rollers and prevented from sagging by a bulge in one of the rollers, and a tray resting on the end of the table to receive fruit-boxes, substantially as set forth.

In testimony whereof I affix my signature in presence of two witnesses.

JOHN B. JOHNSON.

Witnesses:
AL E. BARKER,
C. P. BAUER.